Patented June 2, 1942

2,285,104

UNITED STATES PATENT OFFICE 2,285,104

PRODUCTION OF TITANIUM COMPOUND

David W. Young, Flushing, N. Y., assignor to General Chemical Company, New York, N. Y., a corporation of New York No Drawing. Application March 29, 1940,
Serial No. 326,676

6 Claims. (Cl. 23—202)

This invention relates to production of titanium dioxide particularly suitable for use as pigment in the manufacture of paints and enamels. More especially, the invention is directed to methods for making a very finely divided titanium dioxide pigment product which is substantially pure $TiO_2$ in rutile form.

The more common method for making present-day titanium dioxide pigments of commercial grade involves hydrolyzing titanium sulfate solution to precipitate crude metatitanic acid, separating the latter from the mother liquor, and treating the precipitate to remove some of the associated sulfate. The crude metatitanic acid is then calcined, usually in the presence of a conditioner, at temperatures of 900–1000° C. to form titanium dioxide material having pigment properties. The $TiO_2$ product obtained in this way is, practically speaking, all of the anatase crystalline structure. It has also been proposed to manufacture titanium dioxide pigment by hydrolyzing titanium chloride solution to precipitate a crude titanium oxygen compound stated in the literature to contain some $TiO_2$ in crystal form of rutile. In this procedure, the precipitate is separated from the mother liquor and calcined at the usual temperatures. Literature indicates the calcined material of this method consists largely of titanium dioxide as rutile.

Both these prior processes involve a calcination step during which the products of hydrolysis, in order to develop pigment properties, are heated necessarily to temperatures of the order of 900–1000° C. Because of such high temperatures and the presence of conditioning agent such as an alkali compound, regardless of the care with which calcination is carried out, an appreciable degree of agglomeration of titanium compound is inevitably effected. In order to break down the agglomerates and form ultimate $TiO_2$ material of sufficient fineness to be useful as pigment in the production of paints and enamels, it is customary to subject the calcine to at least a grinding operation. To make $TiO_2$ products adaptable for use for example in enamels, it has been proposed to treat the ground material in a classification process to separate out the coarser oversize particles which are returned to the grinding circuit. Grinding and classification are expensive operations and constitute a substantial amount of the total overall cost for manufacture of titanium oxide pigments from raw material such as ilmenite. While practically all of the titanium pigments commercially available consist of anatase titanium dioxide, it is recognized by those skilled in the art that better commercial pigments would be available if the titanium dioxide were rutile, largely on account of markedly increased covering power of this crystalline form. Accordingly, the art is looking toward development of satisfactory methods for making rutile titanium dioxide having the other known properties, such as suitable color, needed in a first-grade titanium pigment. Thus, while literature indicates production of titanium dioxide pigment containing at least some rutile, obtained for example from the above-noted hydrolysis of titanium chloride solutions, such procedure requires not only calcination of the hydrolysis product but also the above-mentioned subsequent grinding and classification of the calcine where it is desired to form a first-grade product.

A primary object of this invention is provision of methods for making titanium dioxide which on X-ray analysis shows the pattern of rutile only, and which possesses the other known properties of $TiO_2$ pigments of commercial grade. Another particular object is to afford methods for making titanium dioxide having physical characteristics and properties such that it is possible to form rutile of such extreme degree of subdivision that it is not necessary to treat the product according to the grinding and classification procedures customarily used in the art. Another aim of the present improvements is provision of process, for accomplishing these ends, by a procedure the simplicity of which will be self-evident when compared with standard prior practice.

Referring to a particular embodiment of the present improvements, I have found that chlorine containing acetate of titanium is especially suited for use as a titanium containing starting material. Chlorine containing acetates of titanium and methods for making the same are known in the art, several such materials being discussed in Zeitschrift für Anorganische Chemie (1925), vol. 143, pp. 383–393. While precise compositions of these substances may vary to some degree, depending chiefly upon variations in amounts of titanium tetrachloride and glacial acetic acid or acetic anhydride used in their production, such substances are all acetate of titanium and contain chlorine. Regardless of exact composition, these materials are designated herein as chloroacetate of titanium. The other similar halide-acetates of titanium may be used in place of the chloro-acetate. In the production of these halide-acetates of titanium, $TiCl_4$, $TiF_4$, $TiBr_4$, and $TiI_4$ are used as raw materials. On account of availability of titanium tetrachloride and titanium tetrafluoride, which substances ordinarily would be used in manufacture of the chloro- and fluoro-acetates, it is preferred to use in the present process as starting materials the fluoro- and chloro-acetates of titanium, particularly the latter.

I have discovered that by heating chloro-acetate of titanium at relatively high temperature, it is possible to obtain a solid residue in which the titaniferous content is titanium dioxide which on X-ray analysis shows the pattern of rutile only. I have further found that although the solid residue has a fairly rigid and self-sustaining characteristic physical structure, the nature of the material is such that when the residue is subjected to a most gentle degree of pulverization, as by rubbing between the fingers, the material breaks down to an impalpable powder.

Generally speaking, chloro-acetate of titanium may be made by reacting one mol of TiCl4 with at least and ordinarily more than two mols of glacial acetic acid as by heating the mixture under reflux to complete reaction and volatilize HCl. Chloro-acetate of titanium is formed in a usually reddish acetic acid containing mother liquid, coloration being caused by formation of ferric acetate from iron brought into the process as an impurity in the titanium tetrachloride. The chloro-acetate of titanium crystals may be filtered out, preferably under a vacuum or other conditions suitable to prevent contact of the crystals with moisture which is likely to cause conversion of titanium to orthotitanic acid. If the initial titanium tetrachloride is relatively high in iron, as is likely to be the case in commercially obtainable TiCl4, it is advisable to carry out initial reaction of titanium tetrachloride with an amount of acetic acid well in excess of 2 mols to provide a mother liquor of such substantial volume as to facilitate carrying off of the iron acetate with the filtrate on filtration of the chloro-acetate of titanium crystals. Generally, it is advisable to wash the filtered crystals with strong acetic acid to remove occluded iron acetate. In this way, it is relatively simple to make chloro-acetate of titanium containing practically no iron. In order to make a final product the color of which is not adversely affected by iron, it is preferred to use a substantially iron-free halide-acetate of titanium starting material. To illustrate, following is a specific method for making a suitable chloro-acetate of titanium:

200 ml. of glacial acetic acid were mixed with 50 ml. of anhydrous TiCl4. After refluxing for 15 minutes at temperature of about 70–80° C. the clear red solution was cooled to 20° C. to facilitate crystallization of the pale yellow chloro-acetate of titanium crystalline solid. The latter was filtered and the crystals washed with 300 ml. of glacial acetic acid. After drying over calcium chloride, the composition of the product was

| | Per cent |
|---|---|
| Total TiO2 | 31.5 |
| Total Cl | 24.5 |
| Total HAC | 44.0 |

This product corresponds closely with

and it is believed the reaction which took place was approximately

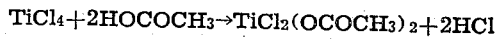

In carrying out the invention, when using chloro-acetate of titanium as the starting material, the same is charged into a furnace or calciner in which the material may be heated at temperature not less than 800° C. The furnace may be externally heated or the material may be directly heated by suitable hot gases. However, where it is desired to form a white, untinted product, heating should be effected in a furnace constructed and operated so as to provide for sweeping out of the heating chamber the reaction gases and vapors such as H2O, chlorine, HCl, and acetic acid. This may be accomplished for example by using hot combustion gases for heating purposes or by permitting sufficient flow of air or other gas through the furnace. In cases where the color of the final product is not of first importance, heating may be carried out in the presence of reaction gases and vapors, although in this instance the ultimate product formed is likely to have a slight bluish tinge probably brought about by reduction of titanium from titanic to titanous form. Temperatures above 800–900° C. are not objectionable although no useful result is obtained.

For the most part, heating time is dependent upon factors such as the size of the charge, design and mode of operation of the furnace, and the relative difference between the size of the heating chamber and amount of material charged. Consequently, it is not feasible to state an all-inclusive minimum heating interval. I have found that where heating of the charge is adequately prolonged at the temperature indicated, the solid residue in the furnace on X-ray analysis shows only the pattern of rutile. Consequently, the best gauge for any specific set of operating conditions is one or two test runs which will readily indicate to the operator, the practicable minimum heating time. Ordinarily, it is preferred to heat for upwards of thirty minutes. In one instance, chloro-acetate of titanium of the composition previously indicated, was calcined at about 850° C. for about two hours under conditions in which reaction gases and vapors were removed by flow of air through the heating chamber, and the product showed X-ray pattern of rutile only.

Experience indicates that for the most part, the reactions involved in a heating operation take place with great rapidity upon introduction of the material into the furnace. On heating at temperatures stated, the charge almost immediately expands roughly 50 times its original volume, and an increment of the charge, unless restricted or confined, grows in a minute or two in a manner remarkably resembling the development and unfolding of a flower blosson two to four inches in diameter. In one instance a 2 gram sample of chloro-acetate of titanium was transformed to a flower blossom petal-like mass about 4 inches in diameter and 2 inches high. Increase of area is tremendous and surface area of the finished product is in the neighborhood of 1000 times that of the starting material. When the process is carried out as preferred, i. e., the heating done in the presence of sufficient flow of inert gas to sweep reaction gas and vapor out of the heating chamber, the color of the product is white, this property being inherent and not induced artificially by the presence of an added conditioning agent during calcination as is the case in customary calcination operation. Apparent specific gravity is low, although the true specific gravity of the TiO2 is 4.27. The titanium dioxide of the product shows X-ray pattern of rutile only. TiO₂ content is around 99%; in one instance analysis showed 99.10% TiO₂, balance consisting of variable small amounts of impurities such as aluminum, silicon, tin, lead, iron, and zirconium. The product is neutral and does not yellow when suspended in oil.

A further surprising aspect of the invention is the discovery that the described heating operation not only produces TiO₂ in rutile crystal structure but also effects formation of a product of such physical characteristics that there is no need to subject the calcined product to the commercially common grinding and classification operations by which prior art TiO₂ pigment products are treated. While the furnaced material of the invention is rigid enough to hold its flower petal-like appearance to a more or less degree, physical constitution of the mass is such that mere rubbing lightly between the fingers reduces the material to an impalpable powder in which no grittiness is discernible by touch. Simple pulverization, as distinguished from milling or grinding to effect a change of particle size, is all that is needed to prepare the furnace product for use in manufacture of high-grade paints and enamels.

Fineness tests show that in a representative pulverized, but unmilled, sample 0.005% by weight of the material was left on a 325 mesh screen. Identical test applied to two of the best commercially available TiO₂ pigments (made by processes involving grinding and classification of calcined TiO₂) also showed 0.005% by weight of residue on a 325 mesh screen. The products of the invention have a low oil absorption number, about 18.

I claim:

1. The method for making titanium oxygen compound which comprises heating halide-acetate of titanium at temperature not less than 800° C. for time interval sufficient to form titanium dioxide product the TiO₂ of which shows X-ray pattern of rutile only, said product being further characterized by (1) taking, when formed in an unrestricted space, a petal-like physical structure of surface area a great many times that of the initial material subjected to heating, and (2) having a fragility such that light rubbing of coalescent particles reduces the product to an impalpable powder.

2. The method for making titanium oxygen compound which comprises heating halide-acetate of titanium at temperature not less than 800° C. for not less than 30 minutes to form titanium dioxide product the TiO₂ of which shows X-ray pattern of rutile only, said product being further characterized by (1) taking, when formed in an unrestricted space, a petal-like physical structure of surface area a great many times that of the initial material subjected to heating, and (2) having a fragility such that light rubbing of coalescent particles reduces the product to an impalpable powder.

3. The method for making titanium oxygen compound which comprises heating material of the group consisting of chloro- and fluoro-acetate of titanium at temperature not less than 800° C. for time interval sufficient to form titanium dioxide product the TiO₂ of which shows X-ray pattern of rutile only, said product being further characterized by (1) taking, when formed in an unrestricted space, a petal-like physical structure of surface area a great many times that of the initial material subjected to heating, and (2) having a fragility such that light rubbing of coalescent particles reduces the product to an impalpable powder.

4. The method for making titanium oxygen compound which comprises heating chloro-acetate of titanium at temperature not less than 800° C. for time interval sufficient to form titanium dioxide product the TiO₂ of which shows X-ray pattern of rutile only, said product being further characterized by (1) taking, when formed in an unrestricted space, a petal-like physical structure of surface area a great many times that of the initial material subjected to heating, and (2) having a fragility such that light rubbing of coalescent particles reduces the product to an impalpable powder.

5. The method for making titanium oxygen compound which comprises heating in a furnace chloro-acetate of titanium at temperature not less than 800° C. for not less than 30 minutes to form titanium dioxide product the TiO₂ of which shows the X-ray pattern of rutile only, and removing reaction gases from said furnace during the heating operation, said product being further characterized by (1) taking, when formed in an unrestricted space, a petal-like physical structure of surface area many times that of the initial material subjected to heating, and (2) having a fragility such that light rubbing of coalescent particles reduces the product to an impalpable powder.

6. The method for making titanium oxygen compound which comprises heating in a furnace chloro-acetate of titanium at temperature of about 850° C. for about 2 hours to form titanium dioxide product the TiO₂ of which shows X-ray pattern of rutile only, said product being further characterized by (1) taking, when formed in an unrestricted space, a petal-like physical structure of surface area a great many times that of the initial material subjected to heating, and (2) having a fragility such that light rubbing of coalescent particles reduces the product to an impalpable powder.

DAVID W. YOUNG.